(No Model.) 2 Sheets—Sheet 1.
W. V. WALLACE.
AIR COOLING MACHINE.
No. 297,039. Patented Apr. 15, 1884.
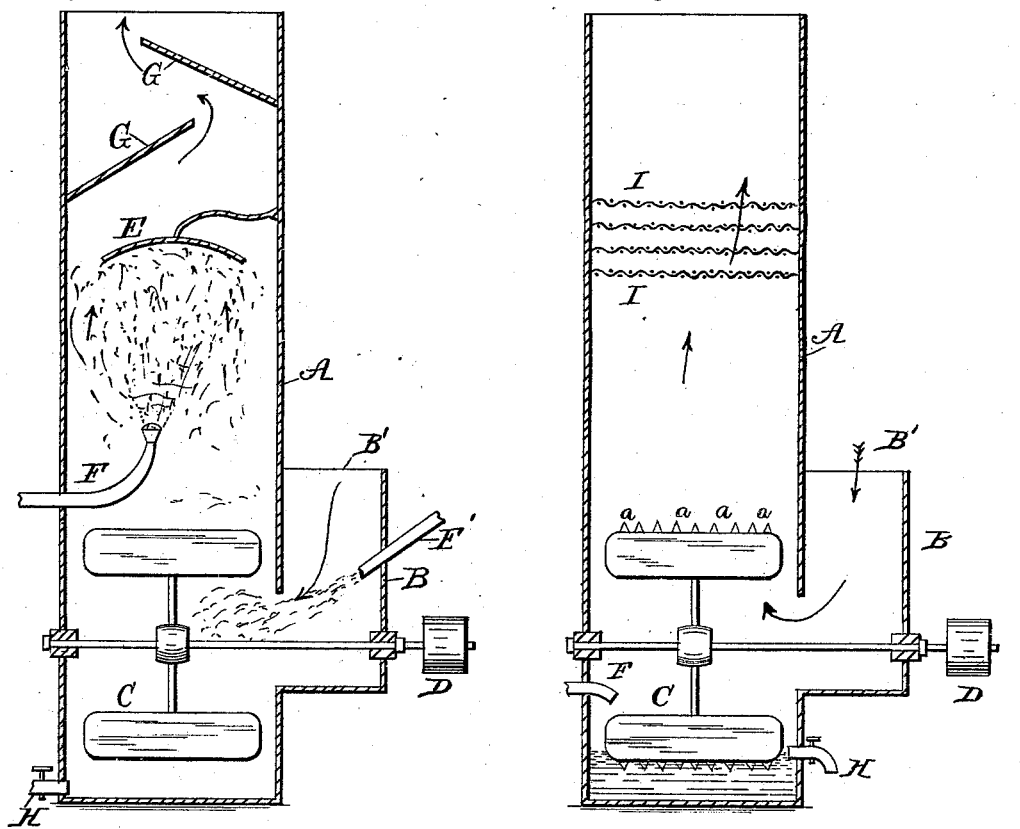
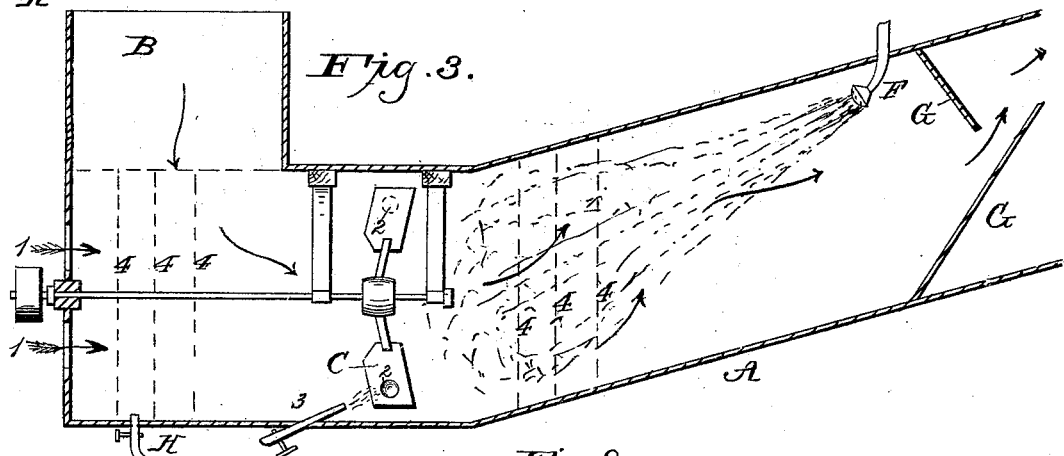
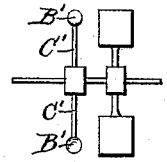
Witnesses:
Inventor:
Wm. V. Wallace
Pr. L. W. Sinsabaugh
Att'y.

(No Model.) 2 Sheets—Sheet 2.
W. V. WALLACE.
AIR COOLING MACHINE.
No. 297,039. Patented Apr. 15, 1884.
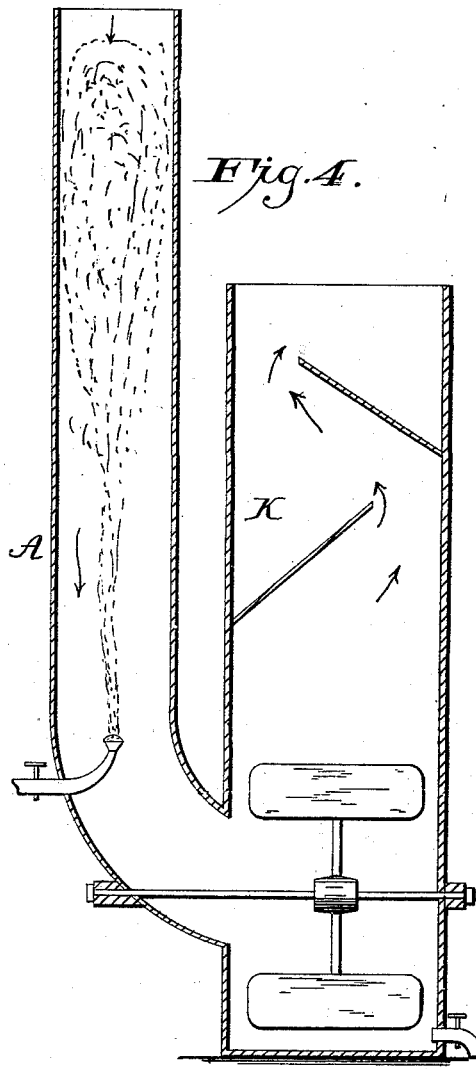
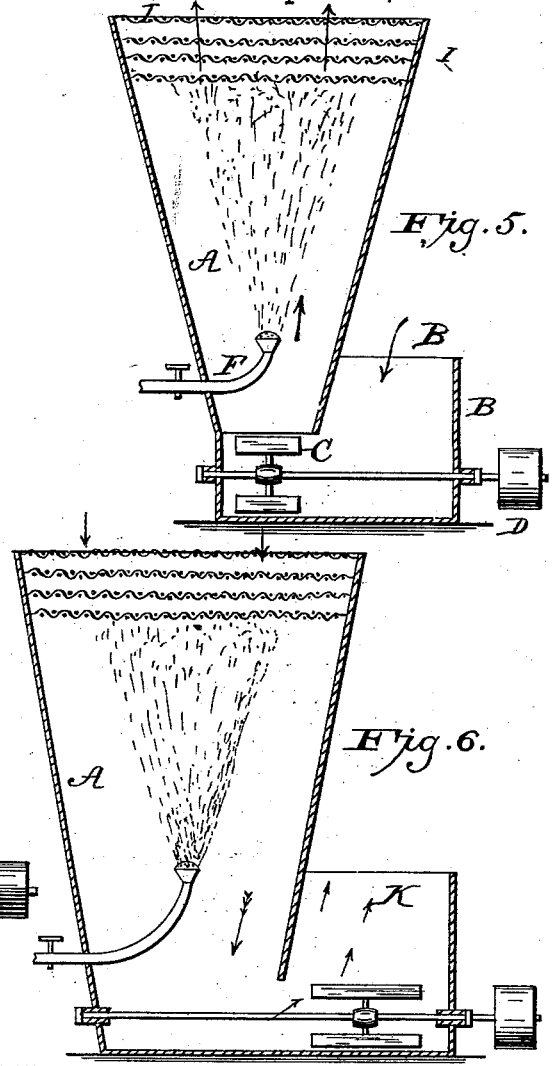
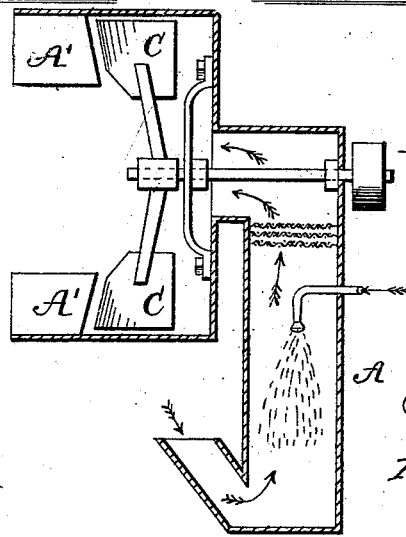
Witnesses:
Inventor:
Wm V Wallace

UNITED STATES PATENT OFFICE.

WILLIAM V. WALLACE, OF BOSTON, MASSACHUSETTS.

AIR-COOLING MACHINE.

SPECIFICATION forming part of Letters Patent No. 297,039, dated April 15, 1884.

Application filed March 4, 1884. (No model.)

*To all whom it may concern:*

Be it known that I, WILLIAM V. WALLACE, a citizen of the United States, residing at Boston, in the county of Suffolk and State of Massachusetts, have invented certain new and useful Improvements in Air-Cooling Machines, of which the following is a specification, reference being had therein to the accompanying drawings.

My invention relates to certain improvements in apparatus for cooling, moistening, and purifying the air in factories, theaters, sick-rooms, and other places where pure fresh air and healthy temperature are desired.

My invention consists in combining a fan or fan-blower with a spray or sprays of water in a chamber, the water being finely divided and the air forced through, or the water being thrown or precipitated directly onto the rapidly-revolving fans, and in this way the air-currents are thoroughly cooled, purified, and moistened while passing through the apparatus.

Figure 1 is a sectional side view of one form of my device, in which the water is sprayed into the vertical chamber above the fan. Fig. 2 is a similar view, in which the water is sprayed or admitted onto the fan of the blower. Fig. 3 is a longitudinal vertical section of a horizontal or inclined chamber in which the water is sprayed against the air-current after it leaves the fan-blower, and also, in dotted lines, a modification which will more fully appear. Fig. 4 is a vertical sectional view of a vertical chamber in which the air-current is drawn in from the atmospheric air against the spray or jet of water and forced by the blower through another chamber into the room. Fig. 5 is a sectional view of still another form, in which the air is drawn in from the bottom of the chamber and forced up through a spray of water traveling in the same direction with the air-current. Fig. 6 is a similar view to Fig. 5, in which the air is drawn down through an ascending spray of water. Fig. 7 is a sectional view of still another modification. Fig. 8 is a detached view of fan-shaft, fan, and bucket.

In the moistening and cooling of air in rooms, it is desirable, in order to produce the best results from a given amount of power, to have the air-currents brought in contact with as great a surface or body of water as possible, and to this end large and expensive machines have been built, which are not only expensive, but occupy much valuable room which might be utilized for other purposes; and it is to overcome these difficulties and produce the required moisture and temperature in rooms that I have devised the mechanism embraced in this application, which I will now proceed to describe.

A is a chamber open at the top, and having an extension, B, at one side, which is also open at the top.

C is a fan or fan-blower mounted in suitable bearings in the lower portion of the chamber A, the projecting end of the shaft of said fan or fan-blower being provided with a pulley-wheel, D, by which power is applied to drive said fan or blower at a high rate of speed.

E is a concave plate, secured in the upper portion of the chamber A, (see Fig. 1,) against which a spray or stream of water is thrown from the pipe F, which breaks the stream of water into thin sheets or spray, thus exposing a great surface of water to the air-current, which is drawn in by the fan through the top of the chamber B at B', and driven up through the water-spray in the chamber A and out in the room or apartment cooled and charged with moisture.

F' indicates a water-supply pipe, by which the water is sprayed onto the fans and in the extension B of the chamber, so that the air, as soon as it enters the apartment B, is subjected to the moistening effect of the water.

G are spray-checks, which prevent the spray and drops of water from being blown out into the apartment.

H is a waste-pipe for drawing off the accumulation of water which may be deposited in the lower portion of the chamber A. A similar construction is shown in Fig. 5, in which the air-current is forced up and travels in the same direction as that of the spray of water thrown from the supply-pipe. In Fig. 2 the water-spray is thrown directly on the vanes of the fan-blower, and the vanes or paddles of the fan-blower are adapted to be partially submerged or to strike the water contained in the lower portion of the chamber A; and for the purpose of producing a better effect the edges of the vanes are provided with cone-shaped projections or points a, which, touching the water, tend to throw the same up against the partitions I of wire-gauze. These partitions I serve as spray-checks, yet allow the air to pass readily therethrough.

In Figs. 3, 4, and 6, I have shown various forms of devices by which the air-currents are thrown or drawn through sprays or streams of water, which are projected or thrown in the opposite direction to the direction of the air-blast, and by which means the water-spray is finely divided and the air thoroughly moistened and cooled before it is projected into the apartment.

In Fig. 3 the spray and water chamber A is shown slightly inclined upward from a horizontal line, while the air is drawn through the rear end of said chamber or through the vertical extension B, and thrown forward through the spray of water let into the chamber A by the pipe F by means of the fan-blower C, the blades or vanes of which are set at an angle, so as to project the air-current through the water-spray with much violence.

G are spray-checks for preventing the free water from being carried into the apartment, while the inclined bottom of the chamber A conveys the surplus water down to the bottom of the chamber, where it is withdrawn through the cock or faucet H.

The outlines shown in Fig. 3 by dotted lines indicate still another form of device by which the principles of my invention may be carried into effect. The portions embraced in the dotted lines indicate a plain cylinder open at both ends, or open at its front or air-delivery end and partially open at its rear or air-receiving end, admitting air at the points indicated by the arrows $l l$. The fans C in this instance are provided with buckets 2 on their backs, into which a stream of water from the pipe 3 is projected, which not only serves to moisten the fans, but also rotates said fans to produce the desired air-currents. This means of propelling the fans by means of a stream of water projected with violence against the blades or buckets may be applied to all the forms shown in the drawings, and is an important feature in this invention.

The dotted lines 4 4 in Fig. 3 indicate spray-guards or diaphragms made of wire-cloth, those in the rear end of the cylinder preventing the water from being thrown back into the apartment by the force of the stream against the blades of the fan, while the guards in the front end prevent the water from the fans from being carried into the apartment or room by the air-current. In carrying this last-described plan into operation, however, I would locate the fans farther back toward the rear end or air-entrance of the cylinder or drum.

In Figs. 4 and 6 the air is drawn down through an upwardly-projected spray or stream of water in the spraying-chamber A, and is cooled and charged with moisture before it reaches the fan-blower, from whence it is distributed to the apartment through the conduits or openings K.

In Fig. 7 I have shown still another modification, in which the air is drawn in at the bottom of the spraying-chamber A, and upwardly through a downwardly-projected spray of water, thence to the fan-blower and into the apartment, the portion of the device in which the fan-blower is located being provided with a series of deflectors, A', to direct the air into the apartment. In this device a spray of water may also be thrown onto the revolving fans.

In Fig. 8 I have shown a detached view of the fan-shaft, fan, and buckets, in which the buckets B' are attached to the fan-shaft by arms C'. Any number of buckets may be attached in this way to the shaft and adapted to be driven by a stream of water directed so as to strike into the buckets, much on the same principle as the ordinary water-wheel. This method of propelling the fans is especially adapted to localities where water-power is most convenient and cheaper than steam-power or power generated by springs, weights, or other combinations of mechanical powers, while at the same time the water used to drive the fans is also used to moisten the fans and cool the air drawn through the machine by the action of said fans.

Various and numerous modifications of devices embodying the principles of my invention will readily suggest themselves to a skilled mechanic. I therefore do not wish to be confined to the particular devices herein shown and described.

Having thus described my invention, what I claim, and desire to secure by Letters Patent, is—

1. The method herein described of cooling and moistening air in rooms or apartments, the same consisting in spraying or pouring water or other air-cooling liquid directly onto rapidly-revolving and positively-driven air-agitating surfaces, as set forth.

2. In a device for cooling and moistening air, the combination of a fan-blower or other air-agitating devices with sprays or jets of water let into the apartment in which the fans are located, or into the channel through which the air is forced, and onto the rapidly-revolving surfaces of the fan-blower, as set forth.

3. In a device for cooling and moistening the air of rooms and apartments, a fan-blower mounted in a suitable casing, having air inlets and outlets, the vanes or shaft of said fan-blower being provided with buckets adapted to be revolved by a stream of water coming in contact therewith, as set forth.

4. In a device for cooling and moistening the air of rooms or apartments, a fan-blower adapted to be revolved in a chamber in which sprays or jets of water are thrown, in combination with a series of spray-guards, whereby the free water is prevented from being thrown into the apartment, as set forth.

In testimony whereof I affix my signature in presence of two witnesses.

WILLIAM V. WALLACE.

Witnesses:
SAML. W. CREECH, Jr.,
GEO. H. PERRY.